United States Patent
Moniz et al.

(10) Patent No.: US 7,883,311 B2
(45) Date of Patent: Feb. 8, 2011

(54) BEARING ASSEMBLY AND METHOD OF ASSEMBLING THE SAME

(75) Inventors: Thomas Ory Moniz, Loveland, OH (US); Robert Joseph Orlando, West Chester, OH (US)

(73) Assignee: General Electric Company, Schenectady, NY (US)

(*) Notice: Subject to any disclaimer, the term of this patent is extended or adjusted under 35 U.S.C. 154(b) by 870 days.

(21) Appl. No.: 11/643,502

(22) Filed: Dec. 20, 2006

(65) Prior Publication Data
US 2008/0152477 A1 Jun. 26, 2008

(51) Int. Cl.
*F01D 25/16* (2006.01)
*F03B 11/06* (2006.01)

(52) U.S. Cl. .............................. 415/1; 415/104; 415/229
(58) Field of Classification Search ................. 415/104, 415/229, 1
See application file for complete search history.

(56) References Cited

U.S. PATENT DOCUMENTS

| | | | |
|---|---|---|---|
| 3,915,521 A | 10/1975 | Young | |
| 4,682,900 A * | 7/1987 | Gu | 384/105 |
| 5,102,237 A | 4/1992 | Ide | |
| 5,113,670 A | 5/1992 | McAuliffe et al. | |
| 5,248,205 A * | 9/1993 | Gu et al. | 384/106 |
| 5,318,366 A * | 6/1994 | Nadjafi | 384/106 |
| 5,735,666 A * | 4/1998 | Johnston | 415/34 |
| 5,803,708 A * | 9/1998 | Mouri et al. | 415/104 |
| 5,833,369 A * | 11/1998 | Heshmat | 384/105 |
| 5,911,511 A * | 6/1999 | Saville | 384/106 |
| 5,961,217 A * | 10/1999 | Heshmat | 384/105 |
| 6,196,790 B1 * | 3/2001 | Sheridan et al. | 415/111 |
| 6,261,002 B1 * | 7/2001 | Ermilov et al. | 384/105 |
| 6,286,303 B1 | 9/2001 | Pfligler et al. | |
| 7,261,300 B2 | 8/2007 | Agrawal et al. | |

FOREIGN PATENT DOCUMENTS

| | | |
|---|---|---|
| EP | 0547279 A1 | 6/1993 |
| WO | 9415106 A1 | 7/1994 |
| WO | 03004911 A2 | 1/2003 |

* cited by examiner

*Primary Examiner*—Edward Look
*Assistant Examiner*—Sean J Younger
(74) *Attorney, Agent, or Firm*—William Scott Andes, Esq.; Armstrong Teasdale LLP

(57) ABSTRACT

A rotor assembly for a gas turbine engine is provided. The rotor assembly includes a compressor rotor, a compressor stator coupled upstream from the compressor rotor, and a bearing assembly coupled between the compressor rotor and the compressor stator for supporting the compressor rotor. The bearing assembly includes a pair of foil thrust bearings coupled to a portion of the compressor stator and a pair of spring packs coupled substantially co-axially to the pair of foil thrust bearings. A method of assembling the same is also provided.

16 Claims, 9 Drawing Sheets

BEARING ASSEMBLY AND METHOD OF ASSEMBLING THE SAME

BACKGROUND OF THE INVENTION

This invention relates generally to gas turbine engines and, more particularly, to bearing assemblies used with turbine engines.

At least some known engines include a plurality of bearing assemblies. Some known bearing assemblies are lubricated with oil wherein the oil is supplied to the bearing assemblies with lubrication lines. The lubrication lines are generally run throughout the engine reducing the amount of available space within the engine.

Moreover, at least some known engines are stored for a time period prior to use. Oil-lubricated bearing assemblies within the engines may require maintenance after being stored to keep the bearing assemblies lubricated.

BRIEF DESCRIPTION OF THE INVENTION

In one aspect, a method of assembling a gas turbine engine is provided. The gas turbine engine includes a compressor assembly including a compressor rotor and a compressor stator. The method includes coupling a bearing assembly including a pair of foil thrust bearings and a pair of spring packs within a portion of the compressor assembly to facilitate supporting the compressor rotor. The method further includes coupling the pair of foil thrust bearings to a portion of the stator such that a first thrust bearing is coupled upstream from the stator and a second thrust bearing is coupled downstream from the stator. The method further includes coupling the pair of spring packs substantially co-axially to the pair of foil thrust bearings such that the first spring pack is upstream from the first thrust bearing and the second spring pack is downstream from the second thrust bearing to facilitate load transfer between the first and second thrust bearings during operation of the engine.

In a further aspect, a gas turbine engine assembly is provided. The gas turbine engine includes a compressor rotor, a compressor stator coupled upstream from the compressor rotor, a bearing assembly, and a second bearing assembly. The bearing assembly is coupled between the compressor rotor and the compressor stator for supporting the compressor rotor. The bearing assembly includes a pair of foil thrust bearings coupled to a portion of the compressor stator, and a pair of spring packs coupled substantially co-axially to the pair of foil thrust bearings. The second bearing assembly is coupled downstream from the bearing assembly, and the second bearing assembly includes a radial foil bearing.

In a further aspect, a rotor assembly for a gas turbine engine is provided. The rotor assembly includes a compressor rotor, a compressor stator coupled upstream from the compressor rotor, and a bearing assembly coupled substantially between the compressor rotor and the compressor stator. The bearing assembly is configured to support the compressor rotor. The bearing assembly includes a pair of foil thrust bearings coupled to a portion of the compressor stator and a pair of spring packs coupled substantially co-axially to the pair of foil thrust bearings.

DETAILED DESCRIPTION OF THE INVENTION

Figure 1:
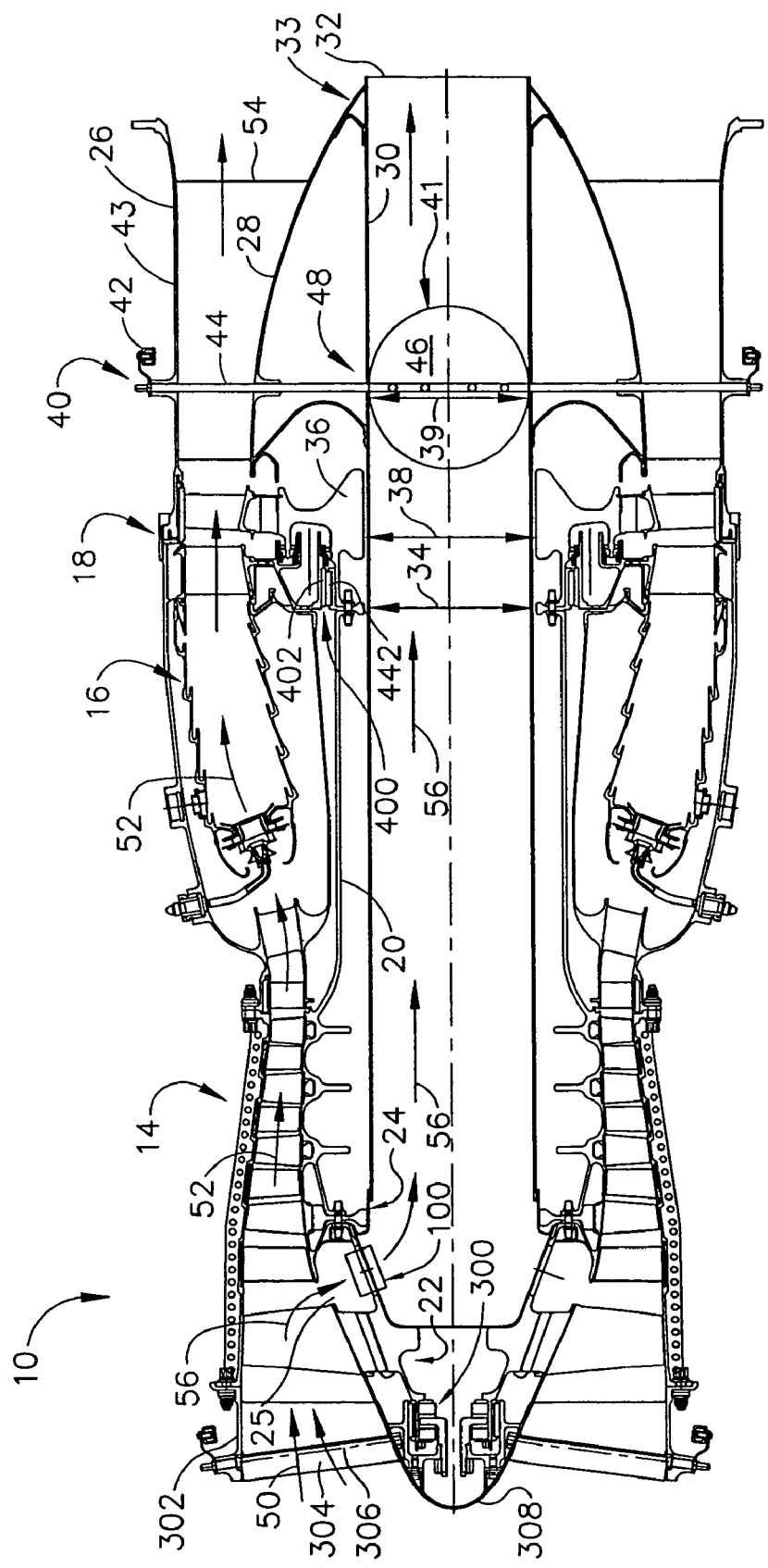
FIG. 1 is a cross-sectional view of an exemplary core gas turbine engine.

FIG. 1 is a schematic illustration of a core gas turbine engine 10. Core gas turbine engine 10 includes a high-pressure compressor 14, a combustor 16, a high-pressure turbine 18, and a shaft 20 that is coupled between high-pressure compressor 14 and high-pressure turbine 18. Compressor 14 includes a first compressor rotor 22 and an adjacent second compressor rotor 24 coupled downstream from first compressor rotor 22. As used herein, first and second compressor rotors 22 and 24 may be any two adjacent rotor sections within compressor 14. Each rotor 22 and 24 includes a rotor disk. A gap 25 is defined between disks of first and second compressor rotors 22 and 24. In the exemplary embodiment, gap 25 is approximately 0.8 inches.

During operation of engine 10, airflow 50 enters engine 10 and is channeled through compressor 14. Airflow 50 is channeled through first compressor rotor 22. A first portion 52 of airflow 50 is channeled downstream through second compressor rotor 24 wherein it is mixed with fuel, and ignited to generate combustion gases that are eventually discharged downstream through discharge nozzle outlet 54. A second portion 56 of airflow 50 is channeled through gap 25 and into an air directing assembly as will be described in detail below.

Moreover, in the exemplary embodiment, core gas turbine engine 10 further includes a rear frame 26 and a centerbody 28. Rear frame 26 extends circumferentially about a portion of core gas turbine engine 10 and extends downstream from high-pressure turbine 18. Centerbody 28 extends circumferentially about an internal air duct 30 and extends downstream from turbine 18. Centerbody 28 is spaced radially inward from rear frame 26 and radially outward from duct 30.

Core gas turbine engine 10 also includes duct 30. Duct 30 is defined within shaft 20 such that duct 30 is substantially concentrically aligned within shaft 20. Duct 30 extends downstream from first compressor rotor 22 to an outlet 32 defined at an aft end 33 of engine 10. In the exemplary embodiment, duct 30 is defined with a substantially constant diameter 34. For example, in one embodiment, diameter 34 is approximately five inches. Alternatively, diameter 34 may be any size that enables engine 10. In the exemplary embodiment, high-pressure turbine 18 includes a high-pressure turbine disk 36, and disk 36 has an inner diameter 38 that is larger than duct diameter 34.

In the exemplary embodiment, core gas turbine engine 10 includes a control valve assembly 40 rotatably coupled downstream from high-pressure turbine 18. In the exemplary embodiment, valve assembly 40 also includes an actuator 42, and a stem 44 extending between actuator 42 and a valve body 46. In the exemplary embodiment, valve body 46 is a butterfly valve 41. In an alternative embodiment, valve body 46 is a ball valve. In the exemplary embodiment, actuator 42 is coupled to a radially outer surface 43 of rear frame 26 and is actuated hydraulically. In an alternative embodiment, actuator 42 is actuated through any other means that enables control valve assembly 40 to function as described herein, such as but not limited to, electrically or pneumatically actuated. In the exemplary embodiment, actuator 42 is operated automatically. In an alternative embodiment, actuator 42 is manually operated. In the exemplary embodiment, valve body 46 is coupled to stem 44 such that rotation of stem 44 controls movement of valve body 46. Stem 44 extends through rear frame 26, centerbody 28, and duct 30. In the exemplary embodiment, body 46 is rotatably coupled within duct 30 to selectively control a flow of air through duct 30. In the exemplary embodiment, body 46 has a diameter 39 that is slightly smaller than diameter 34 of duct 30. More specifically, in the exemplary embodiment, the operation of control valve assembly 40 is electrically coupled to the operation of air directing assembly 100.

Figure 2:
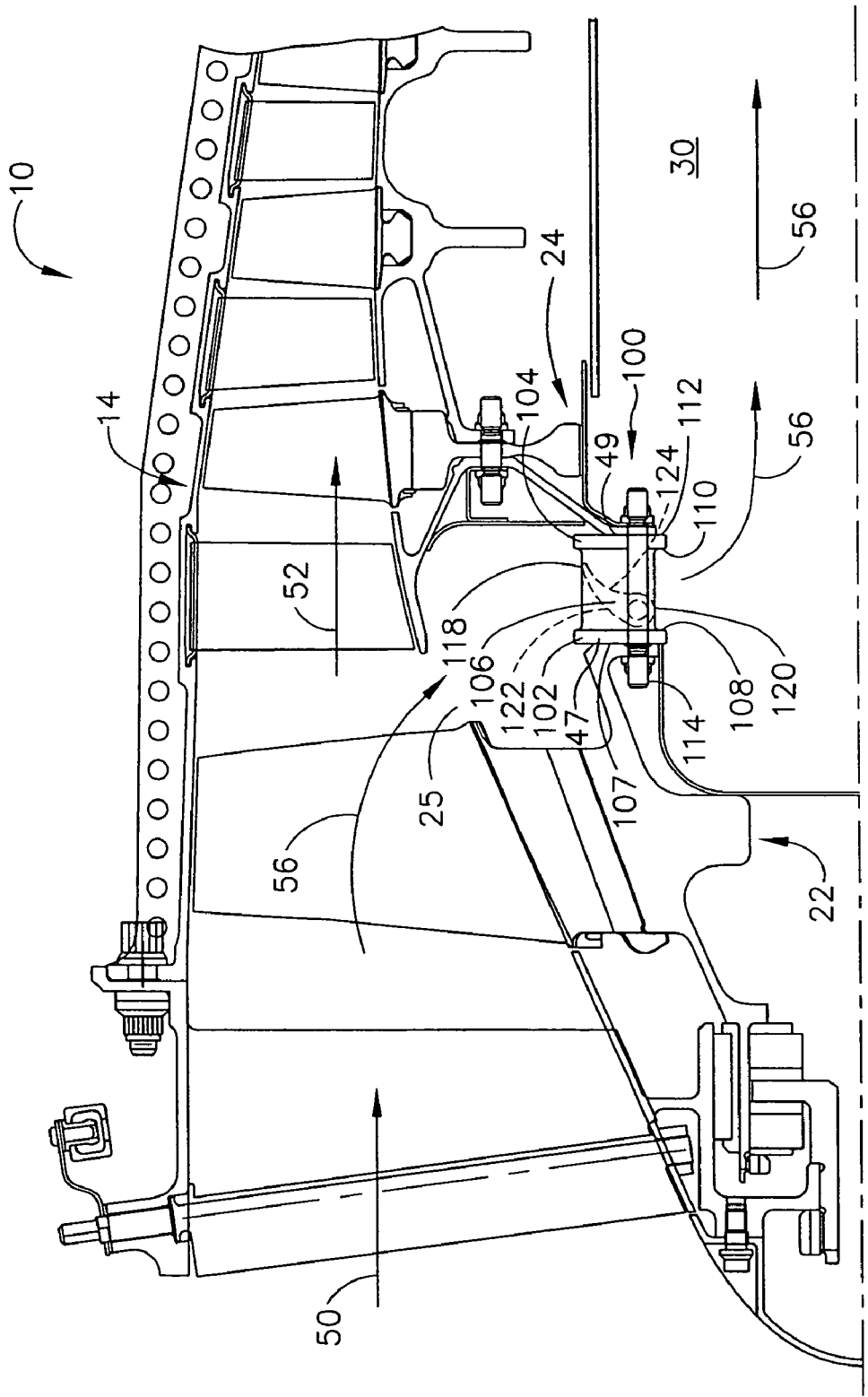
FIG. 2 is an enlarged cross-sectional view of a portion of the exemplary core gas turbine engine shown in FIG. 1.
Figure 3:
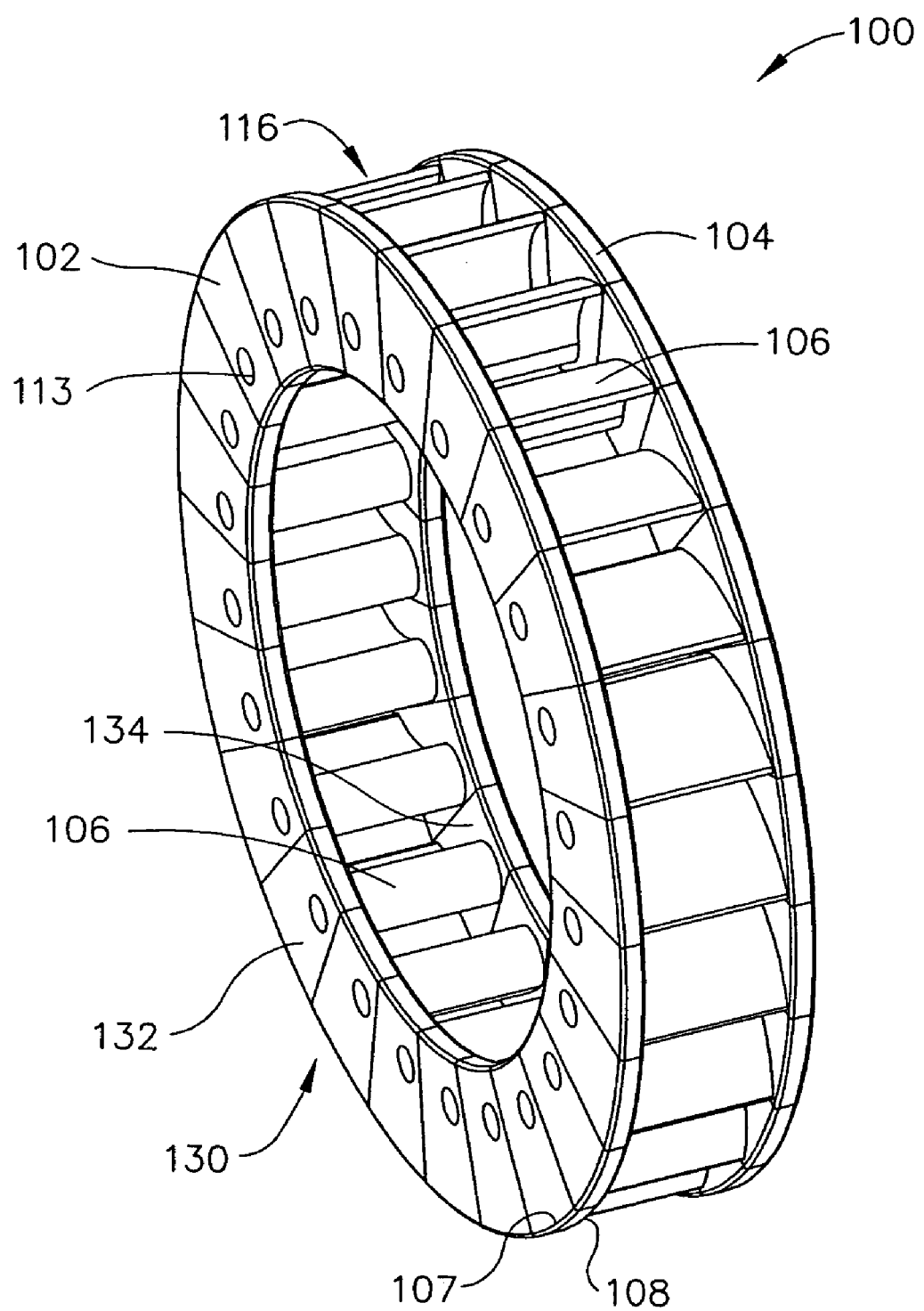
FIG. 3 is an enlarged perspective view of an air directing assembly used with the core gas turbine engine shown in FIG. 2.

FIG. 2 is an enlarged cross-sectional view of a portion of core gas turbine engine 10 including air directing assembly 100. FIG. 3 is an enlarged perspective view of air directing assembly 100. In the exemplary embodiment, air directing assembly 100 is coupled between compressor rotors 22 and 24 to direct airflow discharged from rotor 22 radially inward through internal air duct 30. More specifically, in the exemplary embodiment, assembly 100 is coupled in position within gap 25 such that a downstream side 47 of rotor 22 is coupled to assembly 100, and an upstream side 49 of rotor 24 is coupled to assembly 100.

In the exemplary embodiment, air directing assembly 100 includes a pair of annular rings 102 and 104, and a body 106 extending therebetween. In the exemplary embodiment, rings 102 and 104 are coupled to first compressor rotor 22 and adjacent second compressor rotor 24, respectively. Ring 102 includes an upstream surface 107 and a downstream surface 108, and similarly, ring 104 includes an upstream surface 110 and a downstream surface 112. In the exemplary embodiment, ring 102 is coupled to first compressor rotor 22 such that upstream surface 107 is coupled against first compressor rotor 22. In the exemplary embodiment, ring 104 is coupled to a portion of second compressor rotor 24 such that downstream surface 112 is coupled against second compressor rotor 24. In the exemplary embodiment, downstream surface 108 and upstream surface 110 define a flow path for air to flow through air directing assembly 100. Rings 102 and 104 each include a plurality of openings 113 that extend therethrough. More specifically, openings 113 extend from upstream surfaces 107 and 110 to respective downstream surfaces 108 and 112. Each opening 113 is sized to receive at least one fastening mechanism 114 therethrough to facilitate coupling rings 102 and 104 to rotors 22 and 24, respectively, using a plurality of bolts or fasteners. In the exemplary embodiment, openings 113 in ring 102 are concentrically aligned with openings 113 in ring 104 at the time of manufacture.

In the exemplary embodiment, rings 102, 104 and body 106 are machined or welded together to form air directing assembly 100. In the exemplary embodiment, assembly 100 includes a plurality of ring segments 130 that are coupled together to form a 360° ring. A ring segment 130 includes a single body 106, a portion 132 of ring 102, and a portion 134 of ring 104. For example, the 360° ring may include 36 ring segments 130 that each have an angle of 10°. In the exemplary embodiment, rings 102, 104 and body 106 are fixed to one another such that ring segments 130 do not turn and/or rotate under centrifugal loading.

In the exemplary embodiment, body 106 is aerodynamically-shaped. More specifically, in the exemplary embodiment, body 106 is formed of a plurality of airfoil-shaped members extending between rings 102 and 104 and attached to rings 102 and 104. Moreover, in the exemplary embodiment, airfoil-shaped members 106 are spaced circumferentially to form an annular ring 116 wherein ring 116 extends between rings 102 and ring 104. In the exemplary embodiment, rings 102 and 104 are integrally-formed with ring 116. In an alternative embodiment, rings 102 and 104 are coupled to ring 116, and/or the airfoil-shaped members 106 are coupled to ring 116.

In the exemplary embodiment, each member of body 106 is substantially identical, and each includes an airfoil leading edge 118 and an airfoil trailing edge 120. Moreover, each body 106 includes a first sidewall 122 and a second sidewall 124. First sidewall 122 is convex and defines a suction side of each body 106, and second sidewall 124 is concave and defines a pressure side of each body 106. Sidewalls 122 and 124 are joined together at leading edge 118 and at trailing edge 120 of each body 106. First and second sidewalls 122 and 124 extend in span from upstream ring 102 to downstream ring 104.

During assembly of core gas turbine engine 10, high-pressure compressor 14 is coupled to shaft 20. In the exemplary embodiment, air directing assembly 100 is coupled between first and second compressor rotors 22 and 24. Because air directing assembly 100 is coupled to rotors 22 and 24, air directing assembly 100 rotates concurrently with compressor rotors 22 and 24.

Referring to FIG. 2, during operation, airflow 50 enters engine 10 and is channeled through first compressor rotor 22. First portion 52 of airflow 50 is channeled downstream through second compressor rotor 24 wherein it is mixed with fuel, and ignited to generate combustion gases that are eventually discharged downstream through discharge nozzle outlet 54. Second portion 56 of airflow 50 is channeled through gap 25 and into air directing assembly 100. Air directing assembly 100 channels airflow 56 into duct 30. In the exemplary embodiment, air directing assembly 100 channels airflow 56 across surfaces 108 and 110 of rings 102 and 104, respectively. Moreover, airflow 56 is directed past sidewalls 122 and 124 which direct airflow 56 into duct 30. Airflow 56 cools components of engine 10 as it flows through duct 30. Airflow 56 enables engine 10 to operate at higher cycle temperatures without negatively affecting the operation and efficiency of engine 10. Operating engine 10 at higher cycle temperatures enables engine 10 to be fabricated with a reduced engine size while maintaining constant engine efficiency.

During operation of engine 10, valve assembly 40 is moveable between a first operational position 48 (shown in FIG. 1) and a second operational position (not shown). In the exemplary embodiment, actuator 42 is powered hydraulically and is operated automatically to rotate valve assembly 40 between first operational position 48 and the second operational position. In first operational position 48, airflow 56 flowing through air duct 30 is not impeded by body 46 of valve assembly 40 such that airflow 56 is discharged through outlet 32 (shown in FIG. 1). In the exemplary embodiment, valve assembly 40 is positioned in the first operational position 48 while engine 10 is operating at cruise conditions and provides engine 10 with increased thrust.

Figure 4:
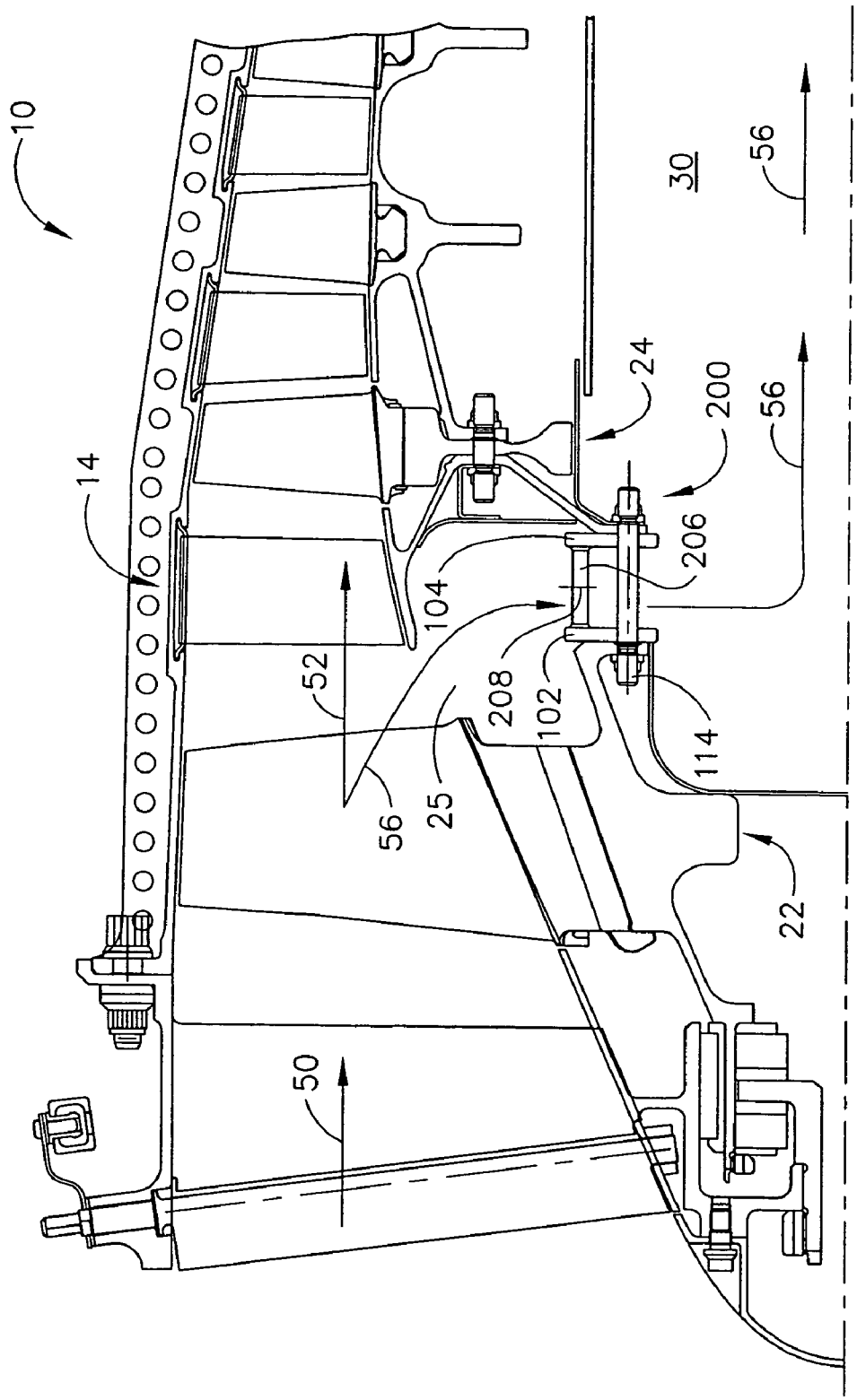
FIG. 4 is an enlarged cross-sectional view of a portion of the core gas turbine engine including an alternative air directing assembly shown in FIG. 1.
Figure 5:
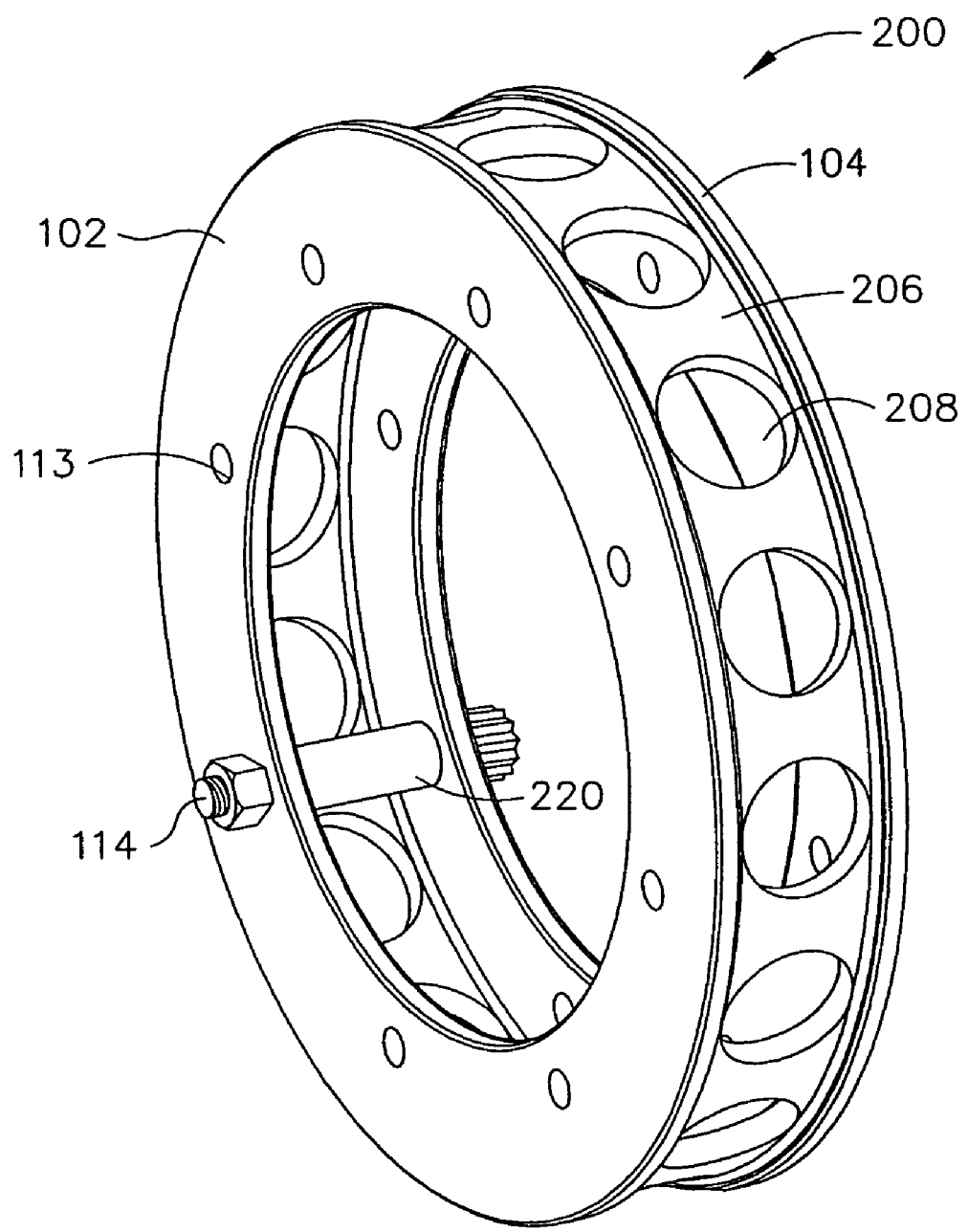
FIG. 5 is an enlarged perspective view of the air directing assembly shown in FIG. 4.

FIG. 4 is an enlarged cross-sectional view of a portion of core gas turbine engine 10 including an alternative air directing assembly 200. FIG. 5 is an enlarged perspective view of air directing assembly 200. Air directing assembly 200 is coupled between first and second compressor rotors 22 and 24 to enable airflow discharged from first compressor rotor 22 to be channeled radially inward through internal air duct 30. Air directing assembly 200 is similar to air directing assembly 100, and as such, components of FIG. 4 that are identical to components of FIG. 2 are referenced in FIG. 4 using the same reference numerals used in FIG. 2.

Air directing assembly 200 is coupled between first and second compressor rotors 22 and 24. In the exemplary embodiment, air directing assembly 200 includes rings 102 and 104, and has a body 206 extending therebetween. Body 206 is annular and is oriented substantially perpendicular to rings 102 and 104. In the exemplary embodiment, rings 102 and 104 are formed integrally with body 206. Alternatively, rings 102 and 104 are coupled to body 206. Specifically, in the exemplary embodiment, body 206 includes a plurality of openings 208 extending therethrough. Openings 208 are sized and oriented to direct air through air directing assembly 200 into internal air duct 30. In the exemplary embodiment, openings 208 have a circular shape. In an alternative embodiment, openings 208 have a square shape. In a further alternative embodiment, openings 208 have any suitable shape that facilitates channeling air 56 through air directing assembly 200.

During assembly of core gas turbine engine 10, high-pressure compressor 14 is coupled to shaft 20. In the exemplary embodiment, air directing assembly 200 is coupled between first and second compressor rotors 22 and 24 to enable air discharged from first compressor rotor 22 to be channeled inwardly through internal air duct 30. Because air directing assembly 200 is coupled to rotors 22 and 24, air directing assembly 200 rotates concurrently with compressor rotors 22 and 24. In the exemplary embodiment, air directing assembly 200 is coupled to first and second compressor rotors 22 and 24 with a plurality of fastening mechanisms 114 such as bolts or fasteners. Each opening 113 is sized to receive at least one fastening mechanism 114. In the exemplary embodiment, at least one sleeve 220 is coupled between an opening 113 of ring 102 and concentrically aligned opening 113 of ring 104. In the exemplary embodiment, sleeve 220 is welded between rings 102 and 104. In the exemplary embodiment, a fastening mechanism 114 extends through opening 113 of ring 102, concentrically aligned opening 113 of ring 104, and sleeve 220 wherein sleeve 220 reduces bending stresses that may be induced to fastening mechanism 114.

Referring to FIG. 4, during operation, airflow 50 enters engine 10 and is channeled through first compressor rotor 22. First portion 52 of airflow 50 is channeled downstream through second compressor rotor 24 wherein it is mixed with fuel, and ignited to generate combustion gases that are eventually discharged downstream through discharge nozzle outlet 54. Second portion 56 of airflow 50 is channeled through gap 25 and into air directing assembly 200. Air directing assembly 200 channels airflow 56 into duct 30. In the exemplary embodiment, air directing assembly 200 channels airflow 56 across surfaces 108 and 110 of rings 102 and 104, respectively. Moreover, airflow 56 is directed through openings 208 which direct airflow 56 into duct 30. Airflow 56 cools components of engine 10 as it flows through duct 30. Airflow 56 enables engine 10 to operate at higher cycle temperatures without negatively affecting the operation and efficiency of engine 10. Operating engine 10 at higher cycle temperatures enables engine 10 to be fabricated with a reduced engine size while maintaining constant engine efficiency.

During operation of engine 10, valve assembly 40 is moveable between first operational position 48 (shown in FIG. 1) and second operational position (not shown). In the exemplary embodiment, actuator 42 is powered hydraulically and is operated automatically to rotate valve assembly 40 between first operational position 48 and the second operational position. In first operational position 48, airflow 56 flowing through air duct 30 is not impeded by body 46 of valve assembly 40 such that airflow 56 is discharged through outlet 32 (shown in FIG. 1). In the exemplary embodiment, valve assembly 40 is positioned in the first operational position 48 while engine 10 is operating at cruise conditions and provides engine 10 with increased thrust.

Figure 6:
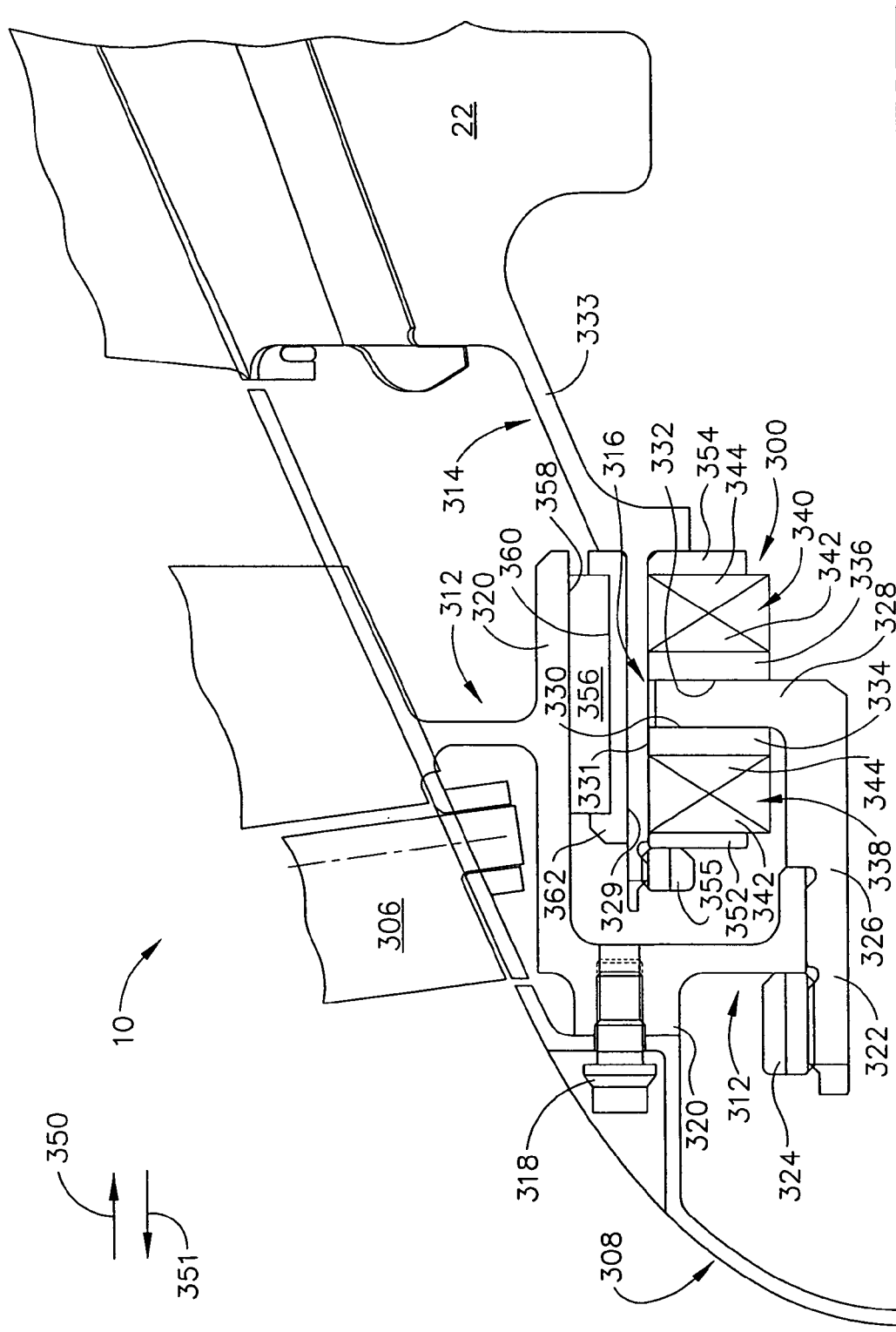
FIG. 6 is an enlarged cross-sectional view of a bearing assembly used with the core gas turbine engine shown in FIG. 1.

FIG. 6 is an enlarged cross-sectional view of a portion of core gas turbine engine 10 including a bearing assembly 300. In the exemplary embodiment, engine 10 further includes a bearing assembly 300 positioned within a portion of the front end of engine 10.

In the exemplary embodiment, engine 10 further includes a casing 302 that substantially circumscribes compressor 14 (shown in FIG. 1). Engine 10 further includes an inlet guide vane 304 and front frame 306 extending between casing 302 and a center hub 308. Inlet guide vane 304 is positioned within an inlet of engine 10 and directs airflow entering engine 10 to compressor 14.

Front frame 306 and hub 308 support bearing assembly 300 which, in turn, supports compressor 14, for allowing rotation thereof. As shown in FIG. 6, in the exemplary embodiment, bearing assembly 300 is coupled substantially between a compressor stator 312 and compressor rotor 314. Rotor 314 is coupled downstream from compressor stator 312. Stator 312 and rotor 314 form an intersection 316 with a substantially T-shaped cross-section.

Specifically, compressor rotor 314 is integrally formed with a forward shaft 333 of compressor rotor 22, which, in turn, rotates compressor 14. Shaft 333 includes a radially outer surface 329 and an opposing radially inner surface 331.

Specifically, stator 312 includes a first portion 320 and a second portion 322 coupled radially inward from first portion 320. In the exemplary embodiment, first portion 320 of stator 312 is coupled to a portion of hub 308 with a coupling mechanism 318 such that stator 312 is a non-rotating member. First portion 320 is coupled to second portion 322 with a fastening mechanism 324. Second portion 322 includes a first portion 326 and a substantially perpendicular second portion 328. Second portion 328 includes an axially upstream surface 330 and an opposing axially downstream face 332.

In the exemplary embodiment, bearing assembly 300 is coupled substantially between compressor stator 312 and rotor 314 and facilitates retaining engine clearance for the front end of engine 10. Specifically, bearing assembly 300 includes a pair of axial foil thrust bearings including a first axial foil thrust bearing 334 coupled adjacent to upstream surface 330 of second portion 328, and a second axial foil thrust bearing 336 coupled adjacent to downstream surface 332 of second portion 328. The pair of axial foil thrust bearings controls forward and aft thrust loads, as will be described in more detail below. Bearing assembly 300 further includes a pair of spring packs coupled to bearings 334 and 336. The pair of spring packs includes a first spring pack 338 coupled to first bearing 334, and a second spring pack 340 coupled to second bearing 336. Bearing assembly 300 further includes a housing coupled to spring packs 338 and 340 to encase bearing assembly 300. The housing includes a first portion 352 coupled to spring pack 338 and a second portion 354 coupled to spring pack 340. A coupling mechanism 355, such as, for example, a spanner nut, couples the housing, the spring packs, and the axial foil thrust bearings to a portion of rotor 314. Bearing assembly 300 also includes a radial foil bearing 356 coupled radially outward from rotor 314.

Figure 7:
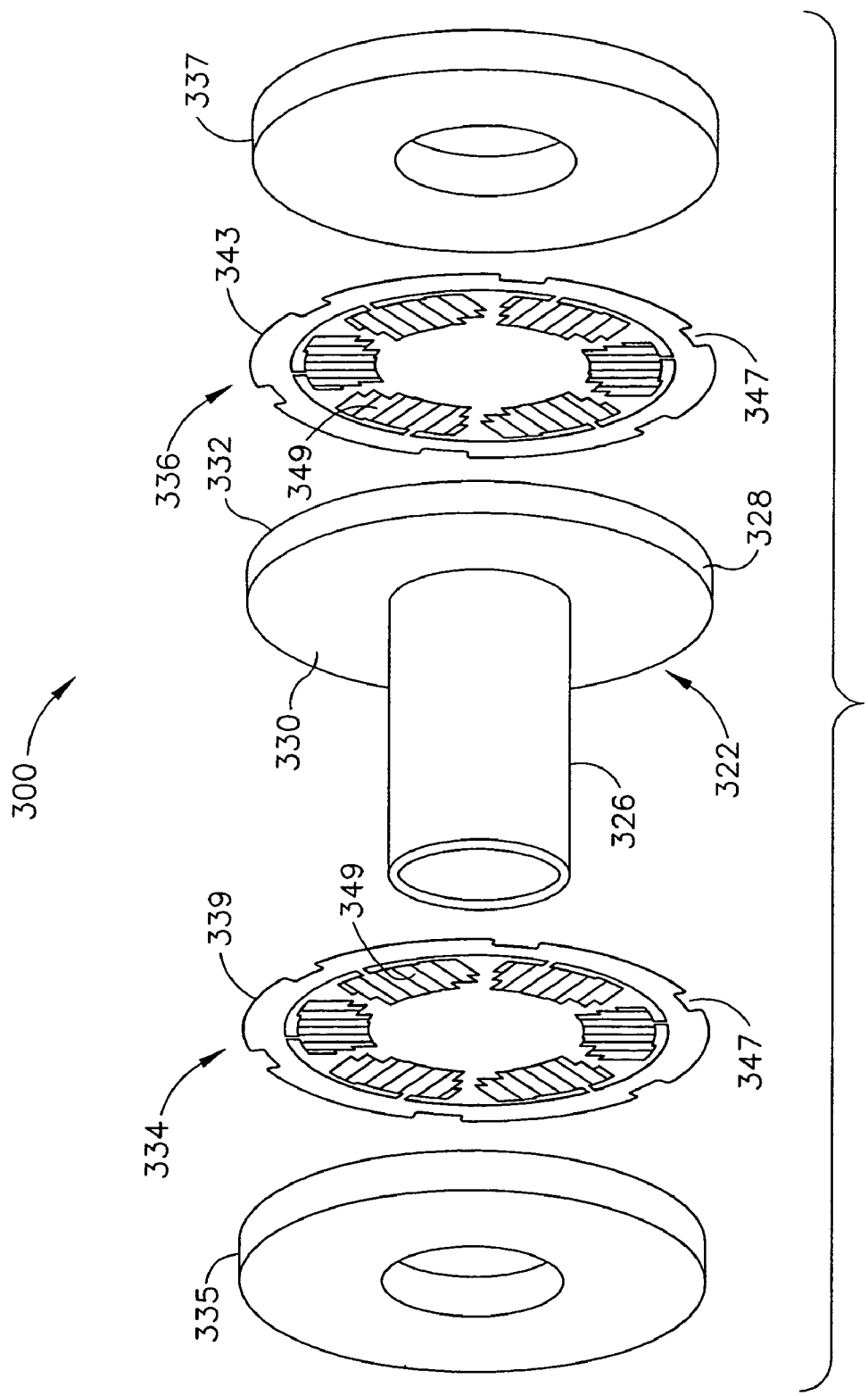
FIG. 7 is an enlarged perspective view of a portion of the bearing assembly shown in FIG. 6.

FIG. 7 is an enlarged perspective of axial foil thrust bearings 334 and 336. Specifically, axial foil thrust bearing 334 includes a thrust runner 335 and an annular spring plate 339. In the exemplary embodiment, spring plate 339 is annular in shape and includes a plurality of spring portions 349, i.e. foil portions, and notches 347. In the exemplary embodiment, thrust runner 335 and annular spring plate 339 are coupled with a distance defined therebetween. Similarly, axial foil thrust bearing 336 includes a thrust runner 337 and an annular spring plate 343. In the exemplary embodiment, spring plate 343 is annular in shape and includes a plurality of spring portions 349, i.e. foil portions, and notches 347. In the exemplary embodiment, thrust runner 337 and annular spring plate 343 are coupled together with a distance defined therebetween.

More specifically, as shown in FIG. 7, annular spring plate 339 is coupled to upstream surface 330 of second portion 328, and thrust runner 335 is coupled upstream to annular spring plate 339. In the exemplary embodiment, annular spring plate 343 is coupled to downstream surface 332 of second portion 328, and thrust runner 337 is coupled downstream to annular spring plate 343.

Figure 8:
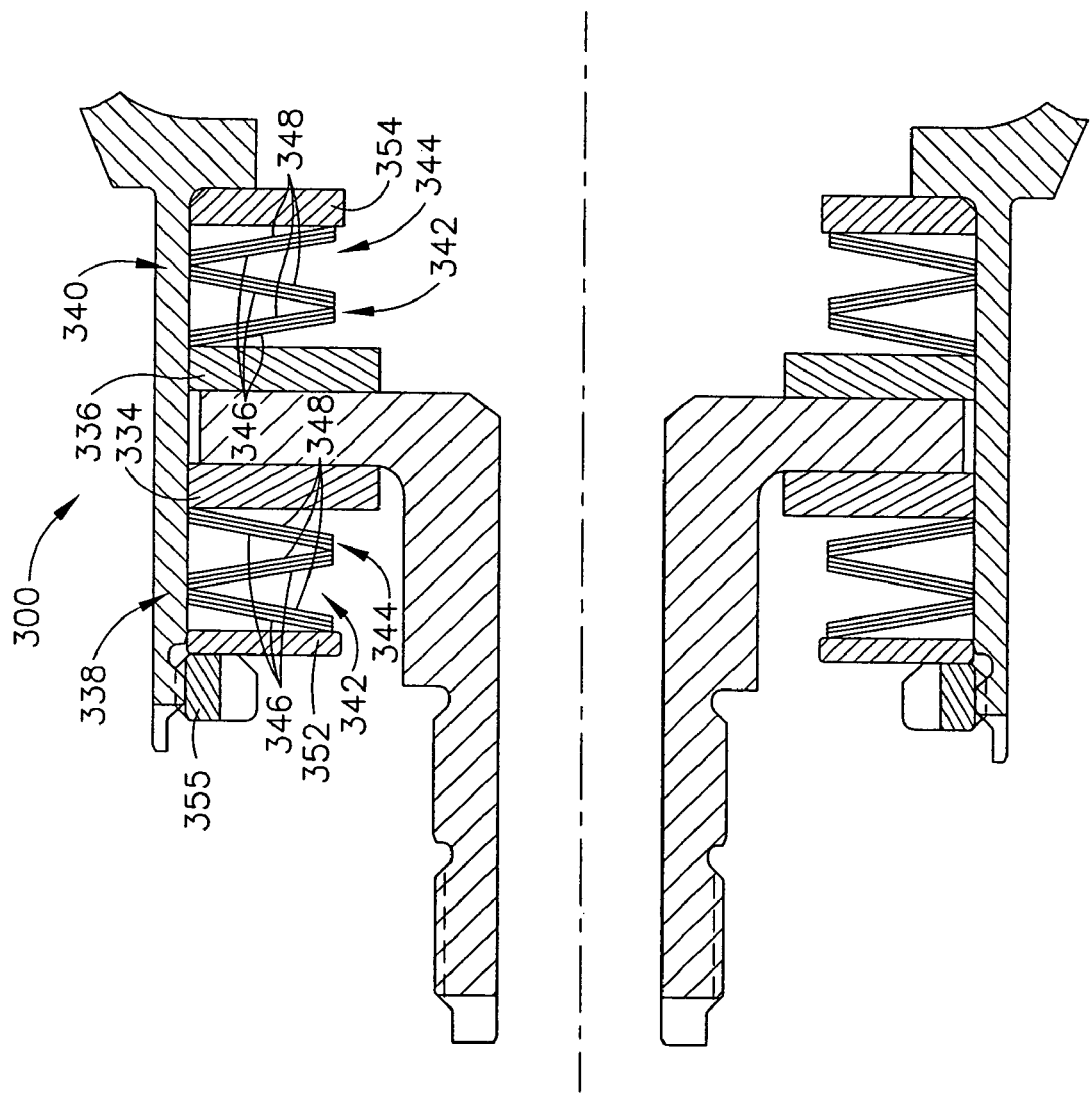
FIG. 8 is an enlarged cross-sectional view of a portion of the thrust bearing assembly shown in FIG. 6.

FIG. 8 is an enlarged cross-sectional view of spring packs 338 and 340 and the housing. Specifically, each spring pack 338 and 340 includes a pair of cupped spring washers. Each spring pack 338 and 340 includes spring washers 342 and 344. In the exemplary embodiment, the washers are Belleville spring washers. Specifically, each washer 342 and 344 has a slight conical shape, and includes a first surface 346 and an opposing second surface 348. First surfaces 346 are coupled adjacent one another in series to provide a pre-load to bearing assembly 300. Second surface 348 of washer 344 of first spring pack 338 is coupled to thrust runner 337 of bearing 334, and second surface 348 of washer 342 of second spring pack 340 is coupled to thrust runner 335 of bearing 344. Coupling washers 342 and 344 in series is similar to coupling a pair of springs in series such that a lower spring constant with greater deflection results. Moreover, coupling washers 342 and 344 in series provides design flexibility such that a specific spring constant and deflection capacity can be designed for varying applications.

Bearing assembly 300 further includes a housing coupled to spring packs 338 and 340 to encase bearing assembly 300. The housing includes a first portion 352 coupled to spring pack 338 and a second portion 354 coupled to spring pack 340. A coupling mechanism 355 couples the housing, the spring packs, and the axial foil thrust bearings co-axially adjacent to one another by extending therethrough. In the exemplary embodiment, coupling mechanism 355 is a bolt or a spanner nut. Coupling mechanism 355 further couples the housing, the spring packs, and the axial foil thrust bearings to a portion of shaft 333 of rotor 314 at a given pre-load to provide thrust to bearing assembly 300. The pre-load is loaded such that bearing assembly 300 will operate properly during all operating conditions.

Moreover, bearing assembly 300 includes a radial foil bearing 356 coupled between a portion of stator 312 and rotor 314. Bearing 356 includes a radially outer surface 358 and an opposing radially inner surface 360. In the exemplary embodiment, outer surface 358 is positioned radially outward from and substantially adjacent to first portion 320 of stator 312. Inner surface 360 is coupled to a portion of shaft 333 with a fastening mechanism 362 such as, for example, a spanner nut.

The first portion 352 of the housing is coupled to spring pack 338 and the second portion 354 of the housing is coupled to spring pack 340. Specifically, first and second portions 352 and 354 are coupled to second surfaces 348 of washers 342. The housing encases bearing assembly 300, and coupling mechanism 355 couples the housing, the spring packs, and the axial foil thrust bearings to a portion of rotor 314. Coupling mechanism 355 retains bearing assembly 300 in compression.

Figure 9:
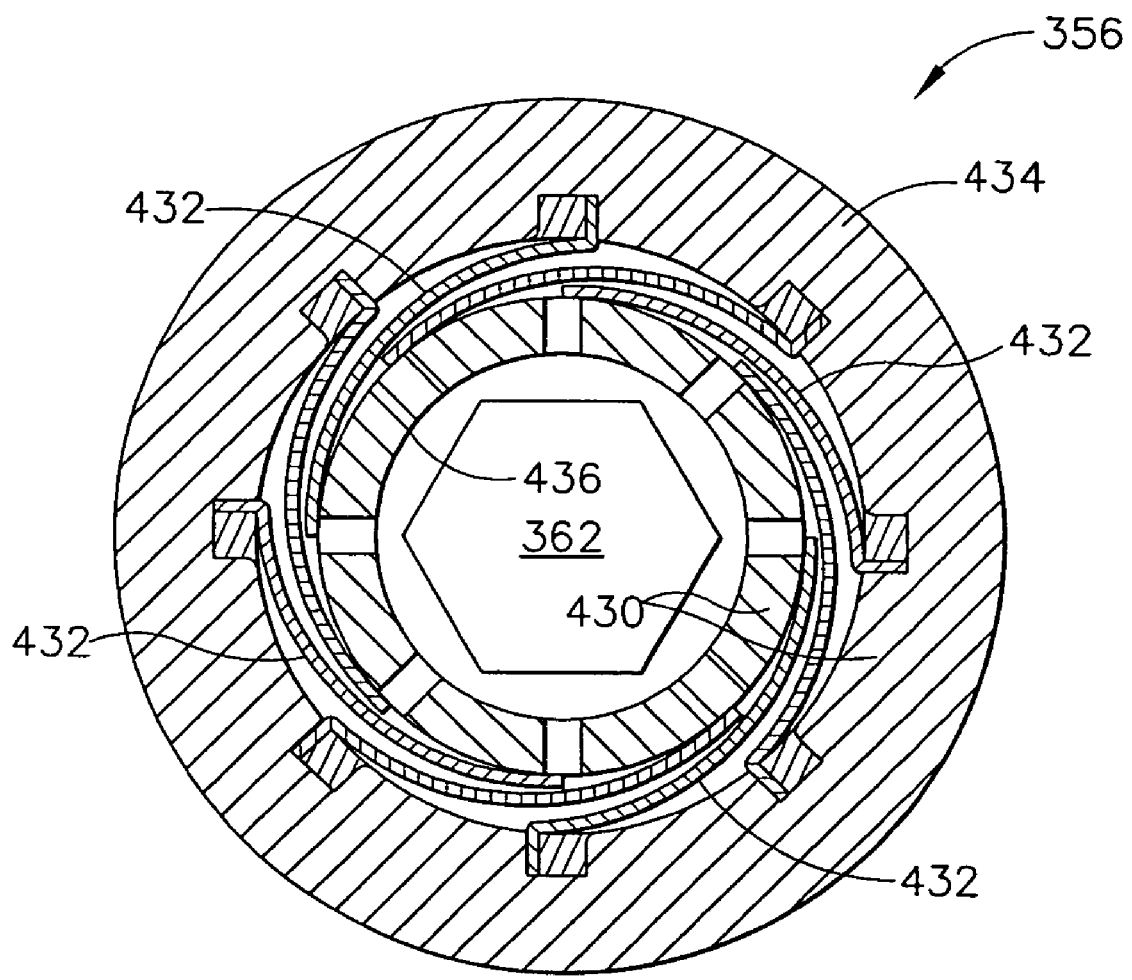
FIG. 9 is an enlarged front view of a portion of the radial bearing assembly shown in FIG. 6.

FIG. 9 is an enlarged front view of radial foil bearing 356. Bearing 356 is coupled to rotor 314 with a fastening mechanism 362. Specifically, in the exemplary embodiment, foil bearing 356 includes a paired race 430, and at least one foil element 432. Paired race 430 includes an outer race 434 and an inner race 436 that is radially inward from outer race 434. Foil elements 432 extend between inner race 436 and outer race 434 and each include a plurality of compliant metal foil elements 432 that are each secured to outer race 434 to facilitate inner race 436 rotating relative to outer race 434. In the exemplary embodiment, foil bearing 356 facilitates reducing the affects of maneuver loads on rotor 314 while also increasing clearance control and sealing between the rotors. Further, using foil bearings within gas turbine engine 10 facilitates reducing a fabrication cost of the gas turbine engine since the foil bearings do not require lubrication, have no DN speed limit, wherein D is defined as a diameter of the bearing bore in millimeters, and N is defined as the top speed of the bearing in revolutions per minute, require no maintenance, and are self-acting hydrodynamic "float on air" devices.

As shown in FIG. 1, bearing assembly 400 includes a bearing 402 that is substantially similar to bearing 356 of bearing assembly 300. Radial foil bearing 402 is coupled to a portion of high-pressure turbine disk 36 with a fastening mechanism 442, such as, for example, a spanner nut.

Bearing assemblies 300 and 400 operate in conjunction within engine 10 such that the engine can operate with minimal control requirements. Bearing assemblies 300 and 400 are oilless bearing assemblies which reduce the complexity and cost of engine 10. Eliminating the need for oil within bearing assemblies 300 and 400, allows engine 10 to meet the life requirements of engine 10 by preventing required maintenance to keep bearing assemblies 300 and 400 lubricated. Moreover, eliminating the need for oil within bearing assemblies 300 and 400 removes any lubrication lines and increases the available space within duct 30. Furthermore, bearing assemblies 300 and 400 are more resilient and therefore do not damage as easily as other known bearing assemblies.

During assembly of bearing assembly 300, rotor 22 including rotor 314 is coupled to shaft 20, and first portion 320 of stator 312 is integrally formed with hub 308. Coupling mechanism 355 couples bearing assembly 300 to portion 328 of second portion 322 of stator 312. Specifically, coupling mechanism 355 couples bearings 334 and 336 to second portion 322 of stator 312, spring packs 338 and 340 to bearings 334 and 336, and couples portions 352 and 354 of the housing to spring packs 338 and 340, respectively. Coupling mechanism 355 couples bearing assembly 300 at a given pre-load to provide thrust to bearing assembly 300. The pre-load is loaded such that bearing assembly 300 will operate properly during all operating conditions. After a portion of bearing assembly 300 and second portion 322 of stator 312 are coupled together, second portion 322 of stator 312 is coupled to first portion 320 of stator 312 with mechanism 324.

Moreover, foil bearing 356 is then coupled radially outward to a portion of shaft 333 of rotor 314 with fastening mechanism 362 wherein surface 358 of foil bearing 356 is positioned substantially adjacent to portion 320 of stator 312.

During assembly of bearing assembly 400, radial foil bearing 402 is coupled to a portion of high-pressure turbine disk 36 with a fastening mechanism 442, such as, for example, a spanner nut.

During operation, engine 10 operates without oil to lubricate bearing assemblies 300 and 400. Axial foil thrust bearings 334 and 336 react thrust through engine 10. Specifically, the distance defined between the members of each bearing 334 and 336 is filled with a fluid during operation such as, for example, air. As thrust runner 335 rotates at a high speed in relation to spring plate 339, fluid pressure is generated through each bearing 334 and 336 forming a fluid film. Similarly, as thrust runner 337 rotates at a high speed in relation to spring plate 343, fluid pressure is generated through each bearing 334 and 336 forming a fluid film. The load capacity of foil thrust bearings 334 and 336 depends on the compliance of the bearings with hydrodynamic pressure exerted by the fluid film developed between the thrust runners 335 and 337, respectively. Spring plates 339 and 343 provide enhanced hydrodynamic characteristics of bearings 334 and 336. Bearings 334 and 336 function best under steady, controlled loading. Spring packs 338 and 340 rotate substantially simultaneously with bearings 334 and 336 generating a constant thrust load across bearings 334 and 336 further improving the hydrodynamic characteristics of bearing assembly 300. Spring packs 338 and 340 and bearings 334 and 336 accommodate for changes during operation by providing cushioning and/or dampening in both the forward and aft directions 350 and 351 (shown in FIG. 6). Specifically, during varying operating conditions, when a forward thrust is generated, bearing 336 is forward loaded and the bearing 334 load is reduced. For example, bearing 336 is forward loaded during full thrust. Similarly, when an aft thrust is generated, bearing 334 is loaded and the bearing 336 is reduced. Moreover, spring packs 338 and 340 along with bearings 334 and 336 are highly resistant to substantial G-loads that result during initial engine startup. The enhanced hydrodynamic characteristics provide improved operation under extreme load conditions.

Moreover, during operation of engine 10, foil bearing 356 of bearing assembly 300 absorbs the radial force generated during rotation of rotor 22 such that rotor 314, and in turn compressor 14, maintains a relatively constant radial position with respect to stator 312. More specifically, as rotor 314 and compressor 14 are forced radially outward during operation, any radial movement of rotor 314 is transmitted to stator 312 such that rotor 314 and compressor 14 are maintained in a relatively constant radial position with respect to stator 312.

During operation of engine 10, foil bearing assembly 400 and bearing 402 operate substantially similar to bearing 356 such that bearing assembly 400 absorbs the radial force generated during rotation of turbine 18. Bearing assemblies 300 and 400 operate to facilitate engine clearance for the front and rear ends of engine 10, respectively.

The method of assembling engine 10 described herein includes, in one embodiment, coupling a bearing assembly including a pair of foil thrust bearings and a pair of spring packs within a portion of the compressor assembly to facilitate supporting the compressor rotor. The method further includes coupling the pair of foil thrust bearings to a portion of the stator such that a first thrust bearing is coupled upstream from the stator and a second thrust bearing is coupled downstream from the stator. The method further includes coupling the pair of spring packs substantially co-axially to the pair of foil thrust bearings such that the first spring pack is upstream from the first thrust bearing and the second spring pack is downstream from the second thrust bearing to facilitate load transfer between the first and second thrust bearings during operation of the engine.

The above-described bearing assemblies facilitate increasing the space within the duct of the engine while maintaining engine efficiency. The above-described bearing assemblies are also more resilient to damage and loads than other known bearing assemblies. Moreover, the bearing assemblies described herein meet the life requirements of the engine. The bearing assemblies further facilitate reducing the cost and complexity of assembling the engine.

Exemplary embodiments of bearing assemblies are described above in detail. Each bearing assembly is not limited to use with the specific embodiments described herein, but rather, each bearing assembly can be utilized independently and separately from other components described herein. Moreover, the invention is not limited to the embodiments of the bearing assemblies described above in detail. Rather, other variations of bearing assemblies may be utilized within the spirit and scope of the claims.

While the invention has been described in terms of various specific embodiments, those skilled in the art will recognize that the invention can be practiced with modification within the spirit and scope of the claims.

What is claimed is:

1. A method of assembling a gas turbine engine including a compressor assembly including a compressor rotor and a compressor stator, said method comprising:

coupling a bearing assembly including a radial foil bearing, a pair of foil thrust bearings, and a pair of spring packs within a portion of the compressor assembly to facilitate supporting the compressor rotor;

coupling the pair of foil thrust bearings to an axially extending portion of the compressor rotor, said pair of foil thrust bearings configured to engage a respective side of a radially outwardly extending portion of the stator such that the first thrust bearing is coupled upstream from the radially outwardly extending stator portion and the second thrust bearing is coupled downstream from the radially outwardly extending stator portion;

coupling the pair of spring packs substantially co-axially to respective ones of the pair of foil thrust bearings, wherein the pair of foil thrust bearings and the pair of spring packs are coupled together with a coupling mechanism, such that the first spring pack is upstream from the first thrust bearing and the second spring pack is downstream from the second thrust bearing to facilitate load transfer between the first and second thrust bearings during operation of the engine; and coupling the radial foil bearing between the compressor stator and a forward end of the compressor rotor and radially outward from the pair of foil thrust bearings.

2. A method in accordance with claim 1 wherein coupling the bearing assembly within a portion of the compressor assembly further comprises coupling the pair of foil thrust bearings and the pair of spring packs within a housing.

3. A method in accordance with claim 2 wherein coupling the bearing assembly within a portion of the compressor assembly further comprises coupling a fastening mechanism to the housing such that the housing is secured to a portion of the compressor stator.

4. A method in accordance with claim 1 wherein said method further comprises coupling a second bearing assembly including a radial foil bearing downstream from the bearing assembly.

5. A gas turbine engine assembly comprising:
a compressor rotor;
a compressor stator including a radially outwardly extending portion, said compressor stator coupled upstream from said compressor rotor;
a bearing assembly coupled between said compressor rotor and said compressor stator for supporting said compressor rotor, said bearing assembly comprising:
a first foil thrust bearing coupled to an axially extending portion of said compressor rotor and configured to engage an upstream side of the radially outwardly extending portion;
a second foil thrust bearing coupled to an axially extending portion of said compressor rotor and configured to engage a downstream side of the radially outwardly extending portion;
a first radial foil bearing coupled between said compressor stator and a forward end of said compressor rotor and radially outward from said first and second foil thrust bearings;
a spring pack coupled substantially co-axially to an upstream side to of said first foil thrust bearing;
a second spring pack coupled substantially co-axially to a downstream side of said second foil thrust bearing; and
a coupling mechanism that couples said pair of foil thrust bearings and said pair of spring packs together; and
a second bearing assembly coupled to an aft end of said compressor rotor downstream from said bearing assembly, said second bearing assembly comprises a second radial foil bearing.

6. A gas turbine engine assembly in accordance with claim 5 wherein said compressor stator comprises a first portion and a second portion coupled radially inward from said first portion, said second portion comprises an upstream surface and an opposing downstream surface, said compressor rotor comprises a radially outer surface and an opposite radially inner surface.

7. A gas turbine engine assembly in accordance with claim 5 wherein each said spring packs comprises at least a first washer and a second washer, each of said first washer and second washer comprises a first surface and an opposing second surface.

8. A gas turbine engine assembly in accordance with claim 5 wherein said coupling mechanism extends through said bearing assembly for coupling said bearing assembly to said compressor rotor.

9. A gas turbine engine assembly in accordance with claim 5 wherein said first radial foil bearing comprises a second radially outer surface and a second radially inner surface, said bearing assembly further comprises a spanner nut coupling said first radial foil bearing to a portion of said compressor rotor, and said second radially outer surface is coupled adjacent to said second portion of said compressor stator.

10. A rotor assembly for a gas turbine engine, said rotor assembly comprising:
a compressor rotor;
a compressor stator including a radially outwardly extending portion, said compressor stator coupled upstream from said compressor rotor; and
a bearing assembly coupled to an axially extending portion of said compressor rotor between said compressor rotor and said compressor stator for supporting said compressor rotor, said bearing assembly comprising a pair of foil thrust bearings each coupled to said axially extending portion of said compressor rotor and configured to engage a respective side of the radially outwardly extending portion of said compressor stator, a radial foil bearing coupled between said compressor stator and said compressor rotor and radially outward from said pair of foil thrust bearings, a pair of spring packs each coupled substantially co-axially to a respective one of said pair of foil thrust bearings, and a coupling mechanism that couples said pair of foil thrust bearings and said pair of spring packs together.

11. A rotor assembly in accordance with claim 10 wherein said compressor stator comprises a first portion and a second portion coupled radially inward from said first portion, said second portion comprises an upstream surface and an opposing downstream surface, said compressor rotor comprises a radially outer surface and an opposite radially inner surface.

12. A rotor assembly in accordance with claim 11 wherein said bearing assembly comprises a pair of axial foil thrust bearings comprising:
a first foil thrust bearing coupled upstream from said upstream surface; and
a second foil thrust bearing coupled downstream from said downstream surface.

13. A rotor assembly in accordance with claim 12 wherein said bearing assembly further comprises:
a first spring pack coupled upstream from said first foil thrust bearing; and
a second spring pack coupled downstream from said second foil thrust bearing.

14. A rotor assembly in accordance with claim 13 wherein each of said spring packs comprises at least a first washer and a second washer, each of said first washer and second washer comprises a first surface and an opposing second surface.

15. A rotor assembly in accordance with claim 10 wherein said coupling mechanism extends through said bearing assembly for coupling said bearing assembly to said compressor rotor.

16. A rotor assembly in accordance with claim 10 wherein said radial foil bearing comprises a second radially outer surface and a second radially inner surface, said second radially outer surface is coupled adjacent to said second portion of said compressor stator, said bearing assembly further comprises a spanner nut coupling said radial foil bearing to a portion of said compressor rotor.

* * * * *